(12) United States Patent
Zafarana

(10) Patent No.: US 10,439,493 B1
(45) Date of Patent: Oct. 8, 2019

(54) METHODS AND SYSTEMS OF OPERATING A RESONANT DICKSON CONVERTER

(71) Applicant: SEMICONDUCTOR COMPONENTS INDUSTRIES, LLC, Phoenix, AZ (US)

(72) Inventor: Alessandro Zafarana, Milan (IT)

(73) Assignee: SEMICONDUCTOR COMPONENTS INDUSTRIES, LLC, Phoenix, AZ (US)

( * ) Notice: Subject to any disclaimer, the term of this patent is extended or adjusted under 35 U.S.C. 154(b) by 0 days.

(21) Appl. No.: 16/123,609

(22) Filed: Sep. 6, 2018

Related U.S. Application Data

(60) Provisional application No. 62/665,294, filed on May 1, 2018.

(51) Int. Cl.
 *H02M 3/156* (2006.01)
 *H02M 1/088* (2006.01)
 *H02M 1/00* (2006.01)

(52) U.S. Cl.
 CPC ........... *H02M 3/156* (2013.01); *H02M 1/088* (2013.01); *H02M 2001/0058* (2013.01)

(58) Field of Classification Search
 None
 See application file for complete search history.

(56) References Cited

U.S. PATENT DOCUMENTS

| 5,610,807 | A | * | 3/1997 | Kanda | H02M 3/158 307/125 |
| 10,224,803 | B1 | * | 3/2019 | Rainer | H02M 1/083 |
| 2004/0264223 | A1 | | 12/2004 | Pihlstrom et al. | |
| 2014/0184189 | A1 | * | 7/2014 | Salem | H02M 3/07 323/299 |
| 2014/0268945 | A1 | | 9/2014 | Low et al. | |
| 2015/0069928 | A1 | | 3/2015 | Karadi et al. | |
| 2015/0077085 | A1 | | 3/2015 | Chen et al. | |
| 2015/0137607 | A1 | | 5/2015 | Agarwal et al. | |
| 2016/0062378 | A1 | | 3/2016 | Ruiz et al. | |

(Continued)

OTHER PUBLICATIONS

Lei, Yutian, et al., "Split-Phase Control: Achieving Complete Soft-Charging Operation of a Dickson Switched-Capacito Converter," IEEE Transactions on Power Electronics, vol. 31, No. 01, Jan. 2016, pp. 770-782, Copyright 2015 IEEE.

(Continued)

*Primary Examiner* — Jeffrey A Gblende
(74) *Attorney, Agent, or Firm* — Dickinson Wright PLLC; Mark E. Scott

(57) ABSTRACT

Operating a resonant Dickson converter. At least some of the example embodiments are methods including: driving a voltage output of the Dickson converter by a resonant current through a first branch for a first on time, the resonant current has a resonant half-period; driving the voltage output by a resonant current through a third branch for a second on time, the resonant current through the third branch has a resonant half-period; and then electrically isolating the first branch and the third branch; detecting, during a first dead time, that the first on time was different than the resonant half-period of the first branch; and adjusting the first on time used in a subsequent cycle of driving the resonant currents, the adjusting makes the first on time more closely match the resonant half-period of the first branch.

20 Claims, 10 Drawing Sheets

(56) References Cited

U.S. PATENT DOCUMENTS

2016/0190917 A1* 6/2016 Delos Ayllon ........ H02M 3/158
                                                            315/307
2016/0329277 A1  11/2016 Hwang
2017/0237342 A1   8/2017 Hwang
2018/0013342 A1   1/2018 Cherniak et al.

OTHER PUBLICATIONS

Li, Yanchao, et al., "Multilevel Modular Switched-Capacitor Resonant Converter with Voltage Regulation," pp. 88-93, Copyright 2017 IEEE.

* cited by examiner

METHODS AND SYSTEMS OF OPERATING A RESONANT DICKSON CONVERTER

CROSS-REFERENCE TO RELATED APPLICATIONS

This application claims the benefit of U.S. Provisional Application No. 62/665,294 filed May 1, 2018 titled "Predictive Resonance Control for a Dickson Converter." The provisional application is incorporated by reference herein as if reproduced in full below.

BACKGROUND

Many applications use power converters that lower voltage. For example, in server rooms with rack-mounted server blades, power may be distributed as a direct current (DC) voltage to each rack, and then utilized by the server blades within each rack. However, as server capability increases, so too does power consumption. In order to provide greater power as server capability increases, in some cases the industry increases the DC distribution voltage used to distribute power to each rack (e.g., from 12 Volts DC (VDC) to 48 VDC) such that more power can be delivered at lower current, in some cases on the pre-existing infrastructure. The increase in DC distribution voltage thus results in the need for additional high efficiency power converters to again lower the supply voltage (e.g., lowering the 48 VDC down to 12 VDC) prior to supplying the power to the server blades within each rack, or at each rack unit or set of rack units. The specification is directed to example power converters that can be used for these and other purposes (e.g., automotive uses).

BRIEF DESCRIPTION OF THE DRAWINGS

For a detailed description of example embodiments, reference will now be made to the accompanying drawings in which.

DEFINITIONS

Figure 1:
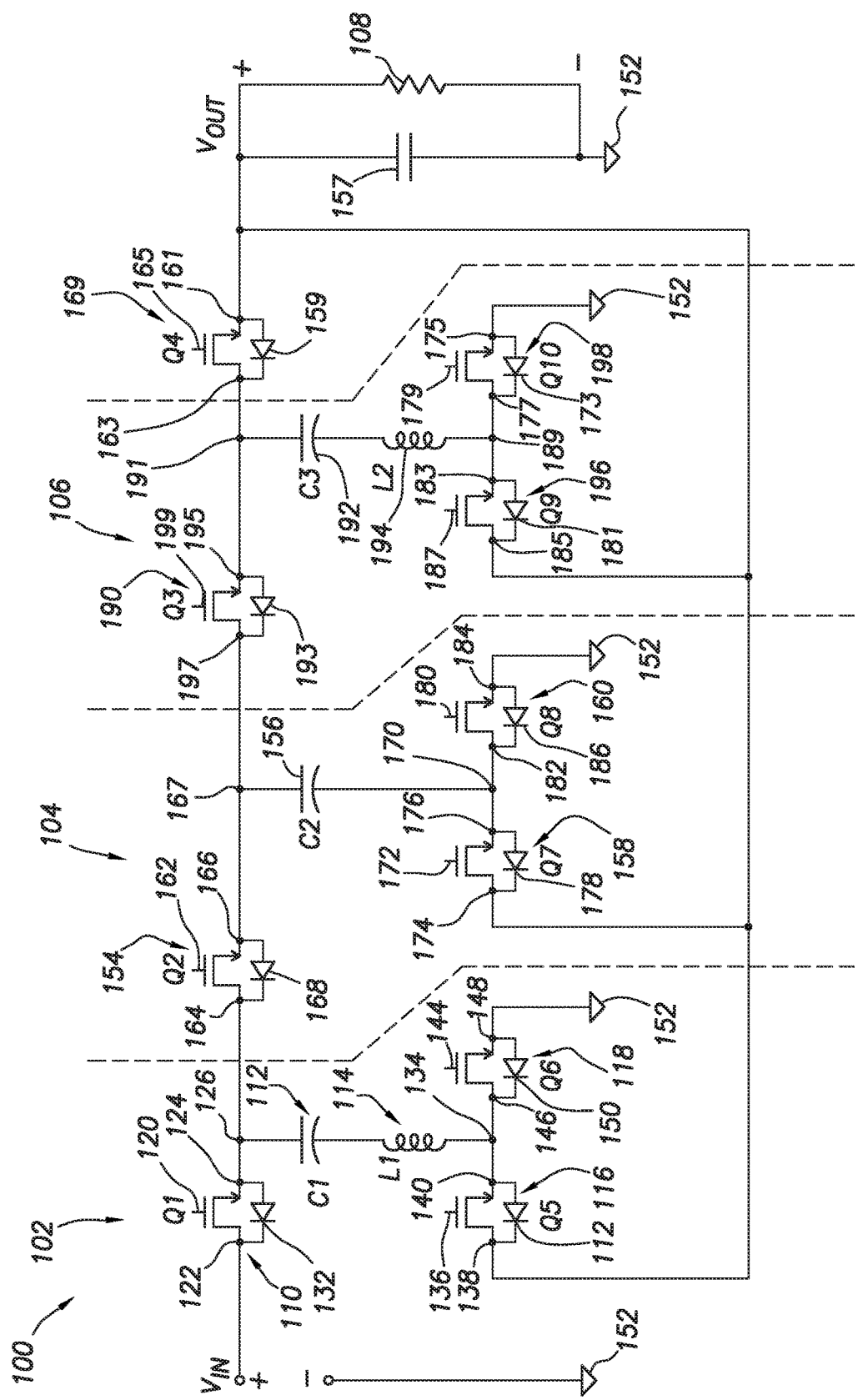
FIG. 1 shows a circuit diagram of a resonant, step down, Dickson converter in accordance with at least some embodiments.

Various terms are used to refer to particular system components. Different companies may refer to a component by different names—this document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" or "couples" is intended to mean either an indirect or direct connection. Thus, if a first device couples to a second device, that connection may be through a direct connection or through an indirect connection via other devices and connections.

"On-time," with respect to a field effect transistor (FET) (or a branch of a Dickson converter) shall mean a length of time the FET (or FETS within a branch) are conductive.

"Resonant period," as it relates to a resonant current having a resonant frequency, is the time duration of one complete cycle of resonant event.

"Resonant half-period" shall mean one half a resonant period.

"Controller" shall mean individual circuit components, an application specific integrated circuit (ASIC), a microcontroller (with controlling software), a field programmable gate array (FPGA), or combinations thereof, configured to read signals and take action responsive to such signals.

In relation to electrical devices, the terms "input" and "output" refer to electrical connections to the electrical devices, and shall not be read as verbs requiring action. For example, a controller may have a gate output and one or more sense inputs.

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

Various embodiments described herein are directed to methods and systems of operating a Dickson converter. More particularly, various example embodiment are directed to methods and systems of operating a Dickson converter having resonant branches (hereafter resonant Dickson converter), and separately controlling the coupling of the resonant branches within each phase to achieve zero volt switching (ZVS) and/or zero current switching (ZCS) of the various electrically controlled switches. More particularly still, example embodiments are directed to a driver integrated circuit (IC) configured to operate resonant Dickson converters, and power converters with an associated driver IC, where the driver IC: separately controls the electrically controlled switches (e.g., field effect transistors (FETs)) associated with the each branch during a first phase to ensure that on-time of each branch substantially matches a resonant half-period of each branch during the first phase; and separately controls the on-times of the FETs associated with the each branch during a second phase to ensure that on-time of each branch substantially matches a resonant half-period of each branch during the second phase. A three-branch Dickson converter has an input-output voltage gain of ¼. The resonant version of the Dickson converter adds an inductor to each branch to create branch resonance. Known art indicates the chance to eliminate the inductor in the mid-branch without affecting the presence of the resonance during each on-time associated with each branch. The specification first turns to an explanation of an example three-branch Dickson converter.

FIG. 1 shows a circuit diagram of a resonant, step down, Dickson converter in accordance with at least some embodiments. In particular, the example Dickson converter 100 comprises a first branch 102, a second branch 104, and a third branch 106 that receive a direct current (DC) at input voltage $V_{IN}$ from a source (the source not specifically shown) and produces a DC output voltage $V_{OUT}$. As the example Dickson converter 100 is a step down converter, the voltage produced at the output voltage of the Dickson converter 100 (i.e., at $V_{OUT}$) may be a fraction of the voltage present at the voltage input $V_{IN}$. The output voltage $V_{OUT}$ may be delivered to a load 108 (illustratively shown as a resistor). The example Dickson converter 100 has two resonant branches (i.e., branch 102 and branch 106), and one non-resonant branch (i.e., branch 104); however, Dickson converters in accordance with example embodiments can have any non-zero number of branches, and the gain of the Dickson converter will be the reciprocal of one half the number of resonant branches. Thus, the example Dickson converter 100 of FIG. 1 has a gain 0.25.

The example resonant first branch 102 comprises a FET 110 (labeled Q1), a capacitor 112 (labeled C1), an inductor 114 (labeled L1), a FET 116 (labeled Q5), and a FET 118 (labeled Q6). The FETs are a specific example of electrically controlled switches, and other electrically controlled switches may include bipolar junction transistors and, for lower-end operating frequencies, solid state relays. Each example branch will be discussed in turn.

The first branch 102 comprises FET Q1 110 that defines control input or gate 120, a first connection or drain 122, and a second connection or source 124. The FET Q1 110 has a body diode 132 coupled from source to drain. The drain 122 couples to $V_{IN}$ of the Dickson converter 100. The source 124 of FET Q1 110 couples to a branch node 126. Branch node 126 couples the first branch 102 to the second branch 104, as will be discussed more below. The first branch 102 further comprises a resonant or LC circuit including capacitor 112 and inductor 114 connected in series, where one end of the LC circuit couples to source 124 of the FET Q1 110. More specifically, a first lead of capacitor 112 is coupled to branch node 126, while a second lead of capacitor 112 is coupled to a first lead of inductor 114. A second lead of inductor 114 is coupled to a node 134. Thus, when FET Q1 110 is turned on, current may be driven from the input voltage $V_{IN}$ through the FET Q1 110 and the LC circuit including capacitor 112 and inductor 114. The node 134 is further defined by the FET Q5 116 and the FET Q6 118. In particular, the FET Q5 116 defines a control input or gate 136, a first connection or drain 138, and a second connection or source 140. FET Q5 116 has a body diode 142 coupled from source to drain. The drain 138 is coupled to the output voltage $V_{OUT}$ of the Dickson converter 100, and the source 140 couples the second lead of inductor 114 and further defines node 134. FET Q6 118 defines a control input or gate 144, a first connection or drain 146, and a second connection or source 148. FET Q6 118 has a body diode 150 coupled from source to drain. The drain 146 of the FET Q6 118 couples to the inductor 114, and the source 148 couples to a ground 152.

Still referring to FIG. 1, the example second branch 104 of the Dickson converter 100 is a non-resonant branch. In particular, the second branch 104 comprises a FET 154 (labeled Q2), a capacitor 156 (labeled C2), a FET 158 (labeled Q7), and a FET 160 (labeled Q8). FET Q2 154 defines a control input or gate 162, a first connection or drain 164, and a second connection or source 166. FET Q2 154 has a body diode 168 coupled from source to drain. The drain 164 of the FET Q2 154 couples to the source 124 of the FET Q1 110, and further defines branch node 126. The source 166 of the FET Q2 154 couples to branch node 167, where branch node 167 couples the second branch 104 to the third branch 106, as discussed more below. In the example second branch 104, capacitor 156 defines a first connection that is coupled to branch node 167 and a second connection that is coupled to the branch node 170. The branch node 170 is further defined by FET Q7 158 and FET Q8 160. In particular, FET Q7 158 defines a control input or gate 172, a first connection or drain 174, and a second connection or source 176. FET Q7 158 has a body diode 178 coupled from source to drain. The drain 174 of FET Q7 158 is coupled to $V_{OUT}$ of the Dickson converter 100, and the source 176 further defines the branch node 170. FET Q8 160 defines a control input or gate 180, a first connection or drain 182, and a second connection or source 184. FET Q8 160 has a body diode 186 coupled from source to drain. The drain 182 is coupled to the source 176 of FET Q7 158, and further defines the branch node 170. The source 184 of FET Q8 160 is coupled to the ground 152.

Still referring to FIG. 1, the third branch 106 of the Dickson converter 100 comprises a FET 190 (labeled Q3), a capacitor 192 (labeled C3), an inductor 194 (labeled L2), a FET 196 (labeled Q9), and a FET 198 (labeled Q9). The manner in which the components of the third branch 106 are connected to each other is similar to that of the components comprising the first branch 102. In particular, FET Q3 190 defines a control input or gate 199, a first connection or drain 197, and a second connection or source 195. FET Q3 190 has a body diode 193 coupled from source to drain. The drain 197 of FET Q3 190 couples to the source 166 of FET Q2 154, and further defines branch node 167. The source 195 of FET Q3 190 couples to a branch node 191, and defines an output of the third branch 106.

Similar to the first branch 102, the third branch 106 comprises a resonant or LC circuit including capacitor 192 and inductor 194 connected in series. One end of the LC circuit couples to the source 195 of FET Q3 190, while the other end couples to a branch node 189. In particular, a first lead of capacitor 192 couples branch node 191, while a second lead of capacitor 192 couples a first lead of inductor 194. A second lead of inductor 194 couples branch node 189. The branch node 189 is further defined by the source of FET Q9 196 and the drain of FET Q10 198. More specifically, FET Q9 196 defines a control input or gate 187, a first connection or drain 185, and a second connection or source 183. FET Q9 196 has a body diode 181 coupled from source to drain. The drain 185 of FET Q9 196 couples to $V_{OUT}$ of the Dickson converter 100, and the source 183 couples the second lead of inductor 194 and further defines branch node 189. FET Q10 198 defines a control input or gate 179, a first connection or drain 177, and a second connection or source 175. FET Q10 198 has a body diode 173 coupled from source to drain. The drain 177 of FET Q10 198 couples to the source 183 of the FET Q9 196. Accordingly, the drain 177 of FET Q10 198 further defines branch node 189. The source 175 of FET Q9 198 is coupled to ground 152.

Still referring to FIG. 1, a FET 169 (labeled Q4) couples the third branch 106, by way of branch node 191, and $V_{OUT}$ of the Dickson converter 100. More specifically, FET Q4 169 defines a control input or gate 165, a first connection or drain 163, and a second connection or source 161. FET Q4 169 has a body diode 159 coupled from source to drain. In the example three-branch Dickson converter 100, the drain 163 of FET Q4 169 couples to branch node 191 and the source 161 couples to $V_{OUT}$. In cases where additional branches are included, the FET Q4 169 may be a member of those further branches; or as shown, FET Q4 169 may serve to selectively isolate the final branch from the output voltage $V_{OUT}$. In various embodiments, the $V_{OUT}$ of the Dickson converter 100 may couple a load 108 and an output capacitor 157.

Still referring to FIG. 1, operation of the Dickson converter 100 may include at least two complementary phases. During a first phase (sometimes "phase one"), the LC circuit of the first branch 102 (including capacitor 112 and inductor 114) couples to the input voltage $V_{IN}$, while the second branch 104 couples the LC circuit of third branch 106 (including capacitor 192 and inductor 194). Accordingly, during phase one current is driven from the input voltage $V_{IN}$ through the LC circuit of the first branch 102 to $V_{OUT}$. Likewise during the phase one, current is driven from capacitor 156 of the second branch 104 through the LC circuit of the third branch 106 to $V_{OUT}$. When the direction of current in the LC circuits is about to switch direction or change polarity, operation of the Dickson converter 100 is switched to a second phase (sometimes "phase two").

During phase two, the LC circuit of the first branch 102 couples the second branch 104. Additionally, the third branch 106 is disconnected from the second branch 104 and instead is coupled to the output voltage $V_{OUT}$ in the example system. Accordingly, during phase two, current is driven from the LC circuit in the first branch 102 to the second branch 104 to charge the capacitor 156. Also during the phase two, current from the LC circuit in the third branch 106 is driven to $V_{OUT}$. For reasons that will become clear below, by leveraging the resonance of each LC circuit in the first and third branches, the methods and systems described herein make it possible to achieve a ZCS. The specification now turns to a deeper explanation of the various phases, including an analysis of voltages within the Dickson converter 100 when switching achieves the ZCS.

Figure 2A:
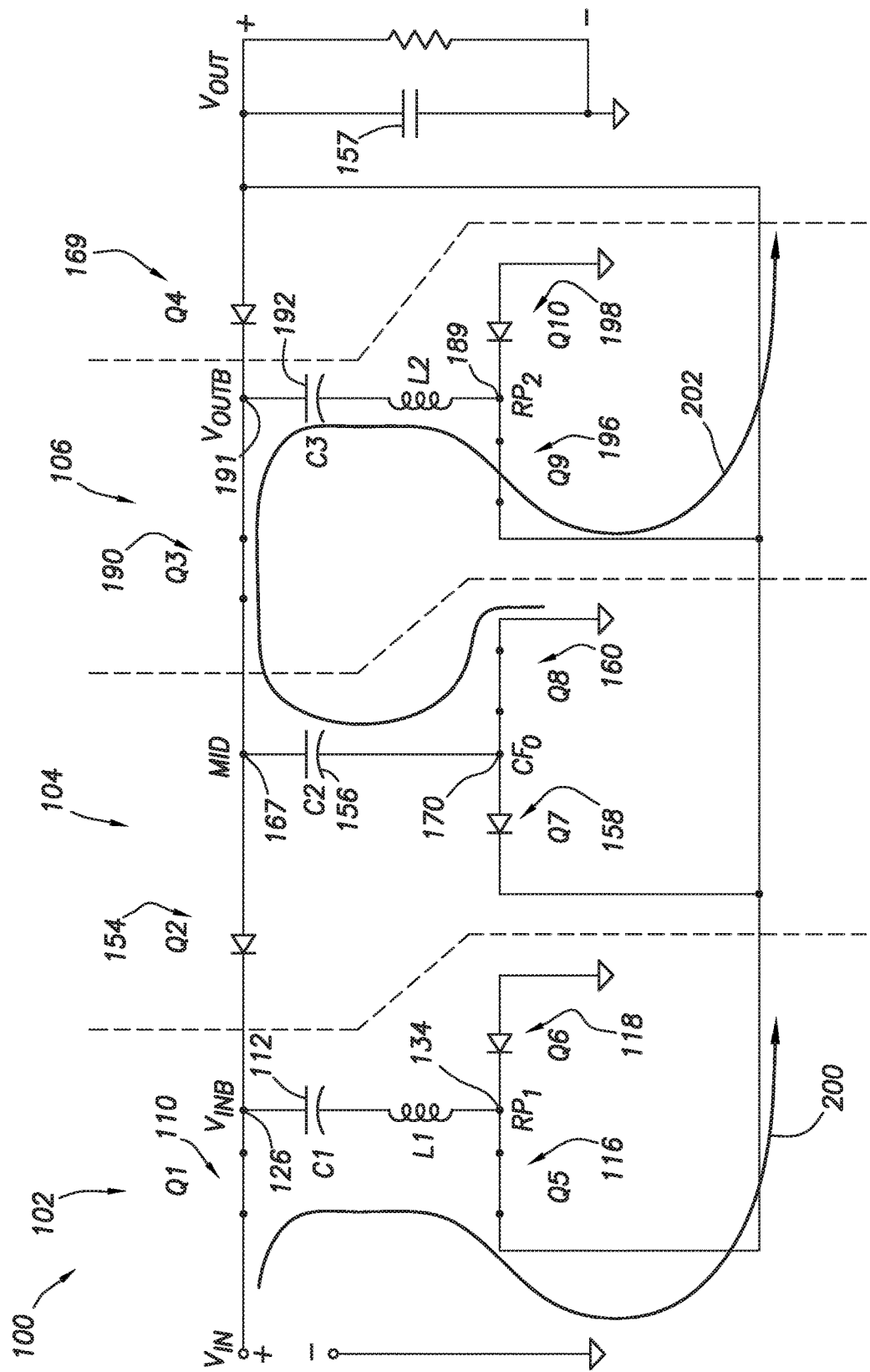
FIG. 2A shows a circuit diagram of the example Dickson converter during phase one in accordance with at least some embodiments.

FIG. 2A shows a circuit diagram of the example Dickson converter 100 during phase one in accordance with at least some embodiments. In particular, in example embodiments all the FETs that are conductive within a phase of operation are made conductive simultaneously. Thus, for purposes of explanation phase one will be said to begin at the instant when all the FETs that are conductive during phase one are made conductive, and phase one is considered to end when phase two begins (i.e., when all the FETs that are conductive during phase two are made conductive). Each phase also includes a dead time at the end of the phase (though the length of the dead time may be different for each branch), and the dead time will be considered to be part of the phase. Whether dead times are considered part of a phase that is ended, or part of a phase that is just beginning, is arbitrary and should not be considered to limit the invention.

In FIG. 2A the FETs that are conductive during phase one are shown as short circuits, and the FETs that are not conductive during phase one are shown merely as their body diodes. During the example phase one, and for the first branch 102, FETs Q1 110 and Q5 116 are conductive, and FET Q6 118 is nonconductive. During the example phase one, and for the second branch 104, FET Q8 160 is conductive, and FETs Q2 154 and Q7 158 are nonconductive. And for the third branch 106, FETs Q3 190 and Q9 196 are conductive, and FET Q10 198 is nonconductive. Also during the first phase FET Q4 169 is nonconductive.

In accordance with example embodiments then, during phase one a resonant current is driven through the first branch 102 to the output voltage $V_{OUT}$ as shown by arrow 200. Because of the LC circuit in the first branch, the first branch has a resonant frequency. Assuming that the output capacitor 157 is significantly larger than the capacitor C1 112, it can be shown that the resonant frequency of the first branch 102 when the FETs are conductive to be:

$$F_R = \frac{1}{2\pi\sqrt{(L_R \times C_R)}} \quad (1)$$

where $F_R$ is the resonant frequency, $L_R$ is the value of inductance within the branch, and $C_R$ is the value of the capacitance of the branch. For reasons that will become clear below, the resonant capacitances in the resonant branches (e.g., the first branch 102 and third branch 106) are selected to have the same value. Similarly, the resonant inductances in the resonant branches (e.g., the first branch 102 and third branch 106) are selected to have the same value. Thus, in some cases L1=L2=$L_R$, and C1=C3=$C_R$. Initially when the FETs Q1 110 and Q5 116 are made conductive, current flows as shown by arrow 200. However, if the FETs remain conductive too long, because of the resonance the current will change direction or polarity, and thus draw current from the capacitor 157 of the output voltage $V_{OUT}$. Oppositely, if the FETs remain conductive too short a time (e.g., the current is still positive and non-zero, or outside a predetermined window of current around zero amps), current will still be flowing when the FETs are made nonconductive.

In accordance with example embodiments then, during phase one a driver integrated circuit (IC) (discussed more below) controls the FETs of the first branch 102 such that the FETs are made nonconductive at the point when the current flow represented by arrow 200 reaches zero (i.e., the ZCS point). The point in time at which ZCS occurs is related to the frequency. That is, the resonant frequency $F_R$ implies a resonant period (i.e., the resonant period being the reciprocal of the resonant frequency $F_R$). The ZCS thus occurs halfway through the resonant period, hereafter referred to as a "resonant half-period."

Still referring to FIG. 2A, further during the example phase one, a resonant current is driven through the third branch 106 to the output voltage $V_{OUT}$ as shown by arrow 202. In this case, the current may be considered to flow from the ground 152, through capacitor 156, through the LC circuit of the third branch 106, and then to the output voltage $V_{OUT}$. As before, arrow 202 implies a current direction flowing to the output voltage $V_{OUT}$. Because of the LC circuit in the third branch 106, the third branch has a resonant frequency during phase one. However, the presence of the capacitor C2 156 from the second branch 104 coupled the LC circuit of the third branch 106 changes slightly the resonant frequency from that given in Equation (1) above. In particular, if it is assumed again that the output capacitor 157 is significantly larger than the capacitor C3 192, and if it is further assumed that the capacitance of capacitor C2 156 is much larger than capacitor C3 192 (e.g., C2=kC3), it can be shown that the resonant frequency of the third branch 106 during phase one to be:

$$F_{R2} = F_R\left(1 + \frac{1}{2k}\right) \quad (2)$$

where $F_{R2}$ is the resonant frequency considered with capacitor C2 156, k is multiple regarding size, and $F_R$ is as defined in Equation (1). For example, for a k=10 the resonant frequency $F_{R2}$ may be 5% greater than $F_R$. Initially when the FETs Q3 190, Q8 160, and Q9 196 are made conductive, current flows as shown by arrow 202. However, if the FETs remain conductive too long voltage will change polarity and thus direction, and draw current from the output capacitor 157 of the output voltage $V_{OUT}$. Oppositely, if the FETs remain conductive too short a time (e.g., the current is still positive and non-zero, or outside a predetermined window of current around zero amps), current will still be flowing when the FETs are made nonconductive.

In accordance with example embodiments then, during phase one the driver IC (discussed more below) controls the FETs of the third branch 106 (and the second branch 104) such that the FETs are made nonconductive at the point when the current flow represented by arrow 202 reaches zero (i.e., the ZCS point), which occurs at the end of the resonant half-period. It is noted, however, that the resonant half-period for the third branch 106 during the phase one is different than the resonant half-period of the first branch 102 during phase one. Thus, in accordance with example embodiments the driver IC separately controls the various FETs during phase one, turning off each set of FETs at the expiration of an on time (calculated in a previous phase one) expected to achieve ZCS.

Figure 2B:
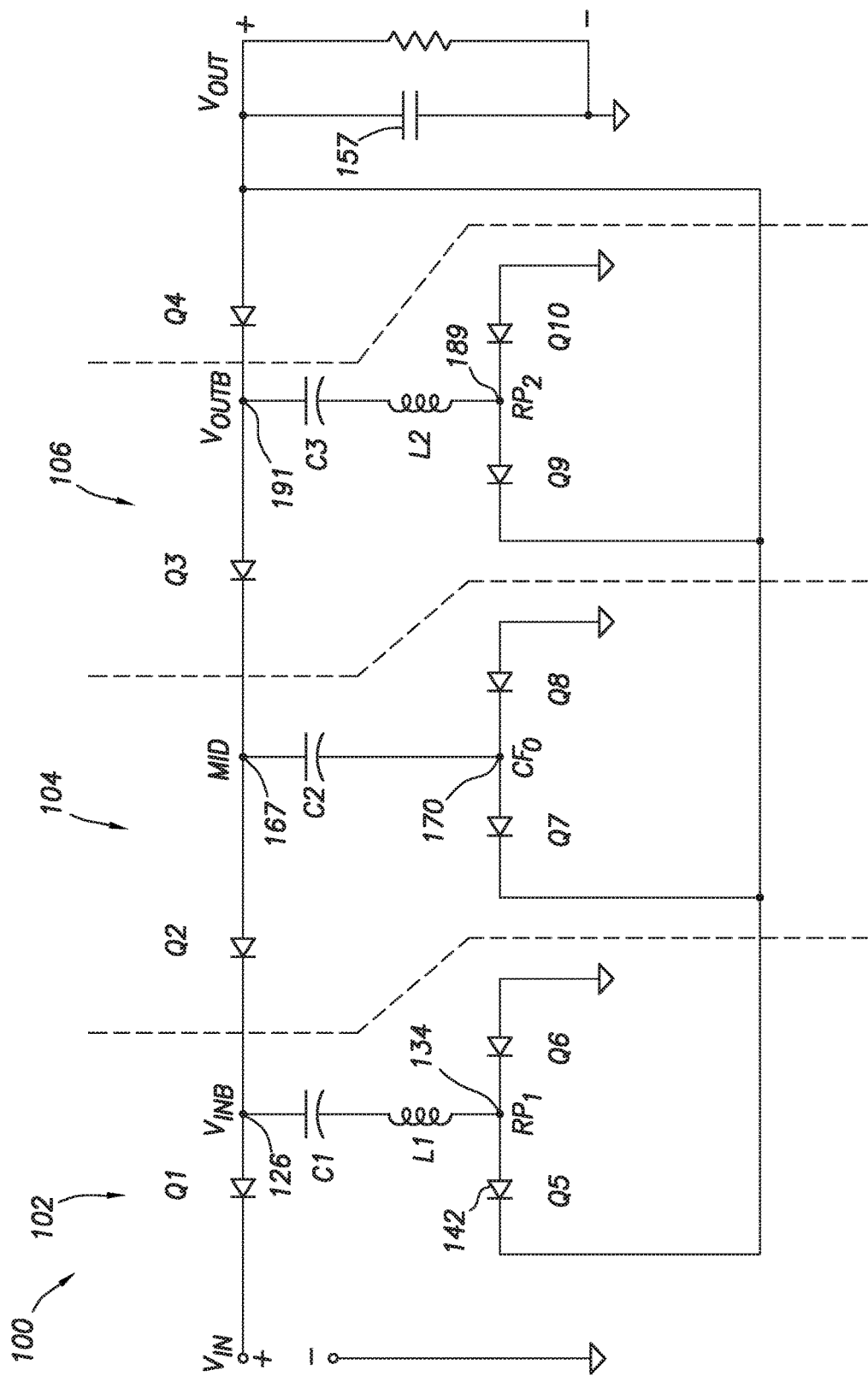
FIG. 2B shows a circuit diagram of the example Dickson converter during phase one in accordance with at least some embodiments.

FIG. 2B shows a circuit diagram of the example Dickson converter during phase one in accordance with at least some embodiments. In particular, FIG. 2B shows the example Dickson converter 100 during the dead time (i.e., when the FETs are nonconductive) of phase one. As all the FETs in the Dickson converter 100 are nonconductive during the dead time, all the FETs in FIG. 2B are shown merely as their body diodes. Once the various FETs are made nonconductive, the driver IC (discussed more below) detects how closely switching occurred to the actual ZCS point within each branch, and adjusts desired on times for use in a subsequent phase one based on the detection. More precisely, the driver IC electrically isolates all the branches of the Dickson converter 100 by making all the FETs non-conductive (at their respective times) as shown in FIG. 2B, thus defining the dead time. The driver IC may detect that the first on time (associated with the first branch 102 during phase one) was different than the resonant half-period of the first branch 102 during phase one. When a difference is noted, the driver IC adjusts the first on time to be used in a subsequent cycle of phase one, and the adjustment makes the first on time more closely match the resonant half-period of the first branch 102. Similarly, the driver IC detects that the second on time (associated with the third branch 106 during phase one) was different than the resonant half-period of the third branch 106 during phase one. When a difference is noted, the driver IC adjusts the second on time to be used in a subsequent cycle of phase one, and the adjustment makes the second on time more closely match the resonant half-period of the third branch 106. The specification now turns to an explanation of detecting when the various on times are different than respective resonant half-periods.

Figure 3:
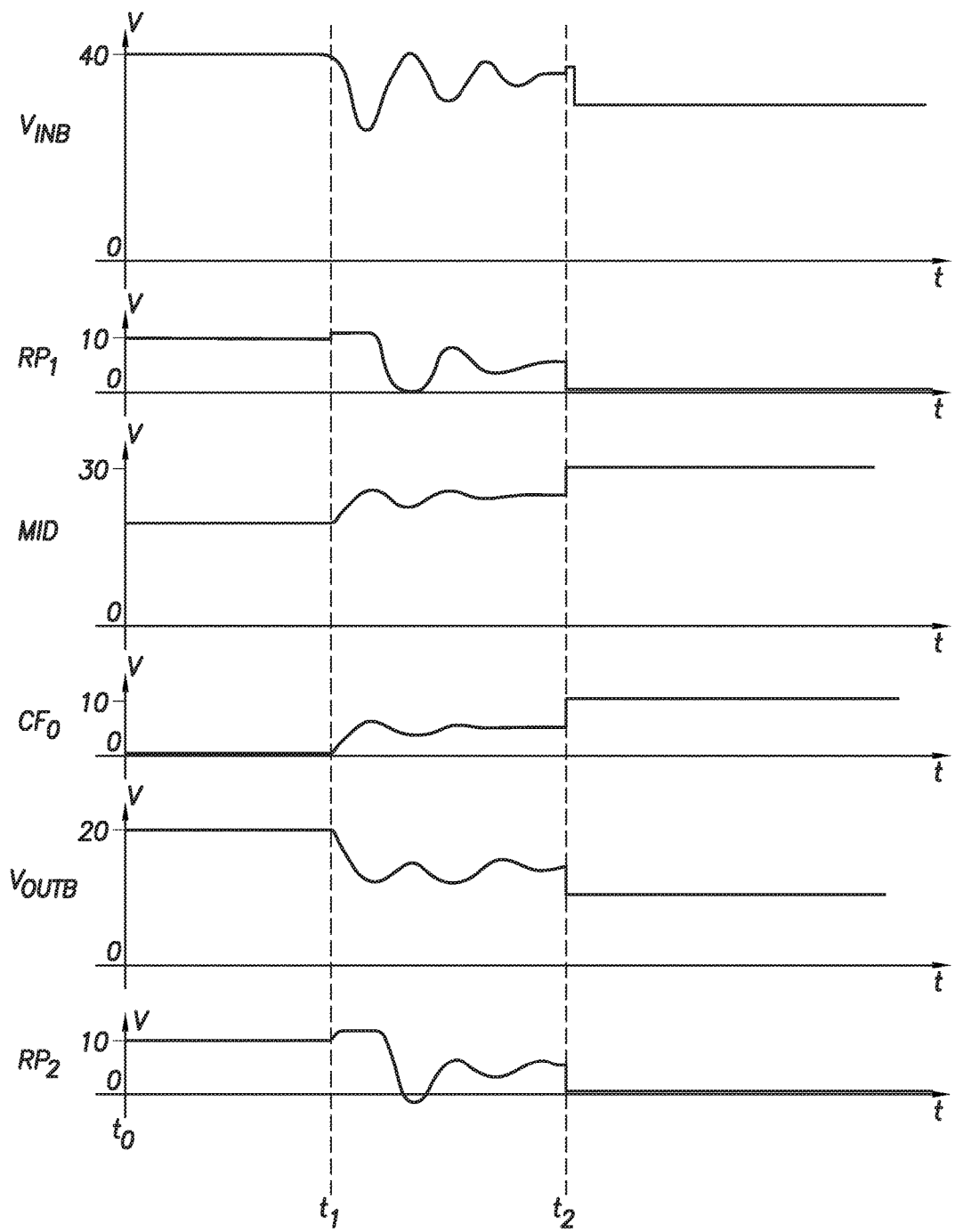
FIG. 3 shows a timing diagram of various voltages within a Dickson converter in accordance with at least some embodiments.

FIG. 3 shows a timing diagram of various voltages within a Dickson converter in accordance with at least some embodiments. In particular, FIG. 3 shows voltages at various branch nodes within the Dickson converter 100 (FIG. 2B) as function of corresponding time in the transition between the end of phase one (at time t2) and the beginning of phase two (again at time t2). More particularly still, FIG. 3 shows the voltage at the branch node 126 (FIG. 2B, labeled VINB), voltage at the branch node 134 (FIG. 2B, labeled RP1), voltage at the branch node 167 (FIG. 2B, labeled MID), voltage at the branch node 170 (FIG. 2B, labeled CFO), voltage at the branch node 191 (FIG. 2B, labeled VOUTB), and voltage at the branch node 189 (FIG. 2B, labeled RP2). The timing diagrams assume a Dickson converter having an input voltage $V_{IN}$ of 40 VDC and an output voltage $V_{OUT}$ of 10 volts, but the explanation scales to any input and output voltage.

The timing diagram of FIG. 3 assumes a transition from the phase one to phase two. In particular, phase one ends at time t2 (with a dead time between time t1 and t2), followed by voltages at the various branch nodes during phase two beginning at time t2. Moreover, FIG. 3 shows reaction of the voltages at the various branch nodes assuming the various FETs are turned off at precisely the ZCS point within each branch. So as not to unduly complicate the figure, it is assumed that the various FETs that are conductive during phase one within each branch are turned off simultaneously, but as already discussed the FETs may be turned off at different times to accommodate the ZCS switching.

As can be seen in FIG. 3, the voltage at the branch node VINB 126 (FIG. 2) during the active part of phase one equals the example input voltage VIN of 40 V. During the dead time between t1 and t2 (i.e., when the FETs non-conductive) the voltage at the branch node VINB 126 oscillates around about 35V, and at the start of phase two at time t2 the voltage drops to about 30V. The voltage at the branch node RP1 134 (FIG. 2B) during the active part of phase one equals the example output voltage $V_{OUT}$ of 10V. During the dead time between t1 and t2 (i.e., the FETs non-conductive) the voltage at the branch node RP1 134 initially goes slightly higher than 10V (caused by conduction through the body diode of FET Q6 118), and then oscillates around about 5V, and at the start of phase two at time t2 the voltage drops to about zero. The voltage at the branch node MID 167 (FIG. 2B) during the active part of phase one equals the midpoint voltage in this example (i.e., 20V). During the dead time between t1 and t2 (i.e., the FETs non-conductive) the voltage at the branch node MID 167 oscillates around about 25V, and at the start of phase two at time t2 goes to about 30V in this example. The voltage at the branch node CFO (FIG. 2B) during the active part of phase is grounded through FET Q8 160. During the dead time between t1 and t2 (i.e., the FETs non-conductive) the voltage at the branch node CFO 170 initially goes slightly higher than 10V (caused by conduction through the body diode of FET Q8 180) oscillates around about 2.5V, and at the start of phase two at time t2 equals the output voltage $V_{OUT}$. The voltage at the branch node VOUTB 191 (FIG. 2B) during the active part of phase one equals the midpoint voltage in this example (i.e., 20V). During the dead time between t1 and t2 (i.e., the FETs non-conductive) the voltage at the branch node VOUTB 191 oscillates around about 15V, and at the start of phase two at time t2 the voltage drops to the output voltage $V_{OUT}$ (i.e., 10V). Finally, the voltage at the branch node RP2 189 (FIG. 2B) during the active part of phase one equals the example output voltage $V_{OUT}$ of 10V. During the dead time between t1 and t2 (i.e., the FETs non-conductive) the voltage at the branch node RP1 134 initially goes slightly higher than 10V (caused by conduction through the body diode of FET Q10 198), and then oscillates around about 5V, and at the start of phase two at time t2 the voltage drops to about zero.

Figure 4:
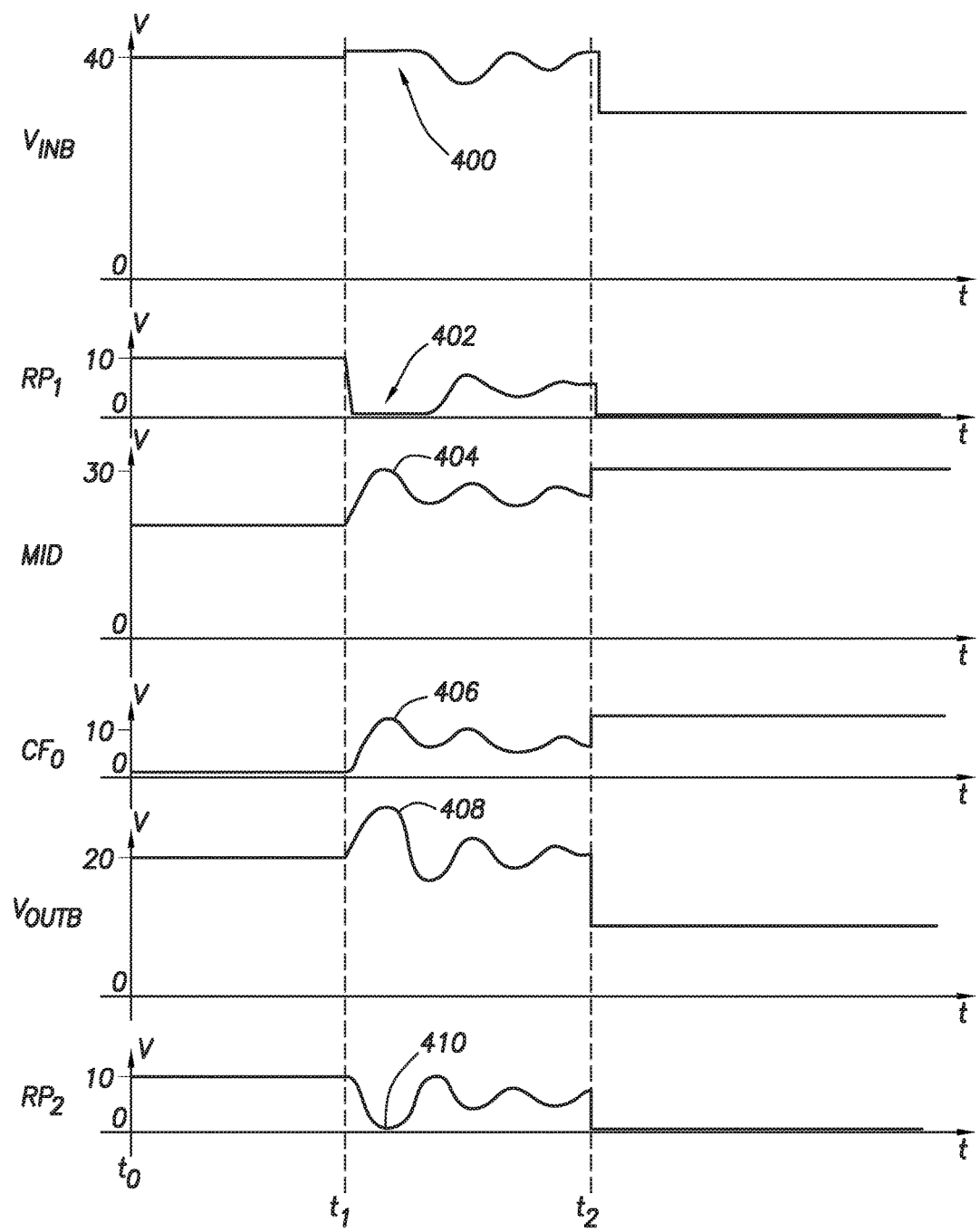
FIG. 4 shows a timing diagram of various voltages within a Dickson converter in accordance with at least some embodiments.

FIG. 4 shows a timing diagram of various voltages within a Dickson converter in accordance with at least some embodiments. In particular, FIG. 4 shows voltages at various branch nodes within the Dickson converter 100 (FIG. 2B) as function of corresponding time in the transition between the end of phase one (at time t2) and the beginning of phase two (again at time t2) assuming the various FETs are turned off prior to the ZCS point within each branch (i.e., the switching frequency is higher than the resonant frequency within each resonant branch). As before, so as not to unduly complicate the figure it is assumed that the various FETs that are conductive during phase one within each branch are turned off simultaneously, but as already discussed the FETs may be turned off at different times to accommodate the ZCS switching.

As can be seen in FIG. 4, the voltage at the branch node VINB 126 (FIG. 2B) during the active part of phase one equals the example input voltage $V_{IN}$ of 40 V. During the dead time between t1 and t2 (i.e., the FETs non-conductive) in this early switching case the voltage at the branch node VINB 126 initially saturates above 40V in zone 400 (as caused by current flowing through the body diode 142 (FIG. 2B) of FET Q5 116 (FIG. 2B)), and then oscillates around about 40V, and at the start of phase two at time t2 the voltage drops to about 30V. The voltage at the branch node RP1 134 (FIG. 2B) during the active part of phase one equals the example output voltage $V_{OUT}$ of 10V. During the dead time between t1 and t2 (i.e., the FETs non-conductive) in this early switching case the voltage at the branch node RP1 134 drops to about 0.7V in zone 402 (i.e., the forward diode drop of the body diode 142 of the FET Q5 116), and then oscillates around about 5V, and at the start of phase two at time t2 the voltage drops to about zero. The voltage at the branch node MID 167 (FIG. 2B) during the active part of phase one equals the midpoint voltage in this example (i.e., 20V). During the dead time between t1 and t2 (i.e., the FETs non-conductive) in the early switching case the voltage at the branch node MID 167 has the same shape as the ZCS switching case (FIG. 3), but the peak voltages are initially higher (e.g., at peak 404). The voltage at the branch node CFO 170 (FIG. 2B) during the active part of phase is grounded through FET Q8 160. During the dead time between t1 and t2 (i.e., the FETs non-conductive) during the early switching case the voltage at the branch node CFO 170 has the same shape as the ZCS switching case (of FIG. 3), but the peak voltages are initially higher (e.g., at peak 406). The voltage at the branch node VOUTB 191 (FIG. 2B) during the active part of phase one equals the midpoint voltage in this example (i.e., 20V). During the dead time between t1 and t2 (i.e., the FETs non-conductive) in this early switching case the voltage at the branch node VOUTB 191 initially goes above 20V at peak 408, and then oscillates around about 20V, and at the start of phase two at time t2 the voltage drops to about 10V. Finally, the voltage at the branch node RP2 189 (FIG. 2B) during the active part of phase one equals the example output voltage $V_{OUT}$ of 10V. During the dead time between t1 and t2 (i.e., the FETs non-conductive) in this early switching case the voltage at the branch node RP2 189 initially goes low at valley 410, and then oscillates around about 5V, and at the start of phase two at time t2 the voltage drops to about zero.

In accordance with example embodiments, a driver IC (discussed more below) can determine whether the various branches were switched early by detecting voltages at the various branch nodes during the dead time. For example, comparing FIGS. 3 and 4, the driver IC can detect an early switching of the first branch 102 (FIG. 2B) by the fact that the voltage at the branch node VINB 126 (FIG. 2B) saturates high in the initial part of the dead time as in FIG. 4, as opposed to oscillating in the early part of the dead time as in FIG. 3. As another example, the driver IC can detect an early switching in the first branch 102 by the fact the voltage at the branch node RP1 134 (FIG. 2B) drops low in the initial part of the dead time as in FIG. 4 zone 402, as opposed jumping slightly above 10V during the early part of the dead time as in FIG. 3. By sensing any of the various voltages noted, the driver IC may detect that the first on time of the first branch during phase one was different than the resonant half-period (e.g., shorter than the resonant half-period), and adjust the first on time used in a subsequent first phase cycle.

As yet another example, the driver IC can detect an early switching in the third branch 106 (FIG. 2B) by the fact that the voltage at the branch node VOUTB 191 (FIG. 2B) jumps above 20V during the initial part of the dead time as in FIG. 4 peak 408, as opposed to initially dropping below 20V in the early part of the dead time as in FIG. 3. As another example, the driver IC can detect an early switching in the third branch 106 by the fact that the voltage at the branch node RP2 189 (FIG. 2B) drops low in the initial part of the dead time as in FIG. 4 valley 410, as opposed jumping slightly above 10V during the early part of the dead time as in FIG. 3. By sensing any of the various voltages noted, the driver IC may detect that the second on time of the third branch during phase one was different than the resonant half-period (e.g., shorter than the resonant half-period), and adjust the second on time used in a subsequent first phase cycle.

Figure 5:
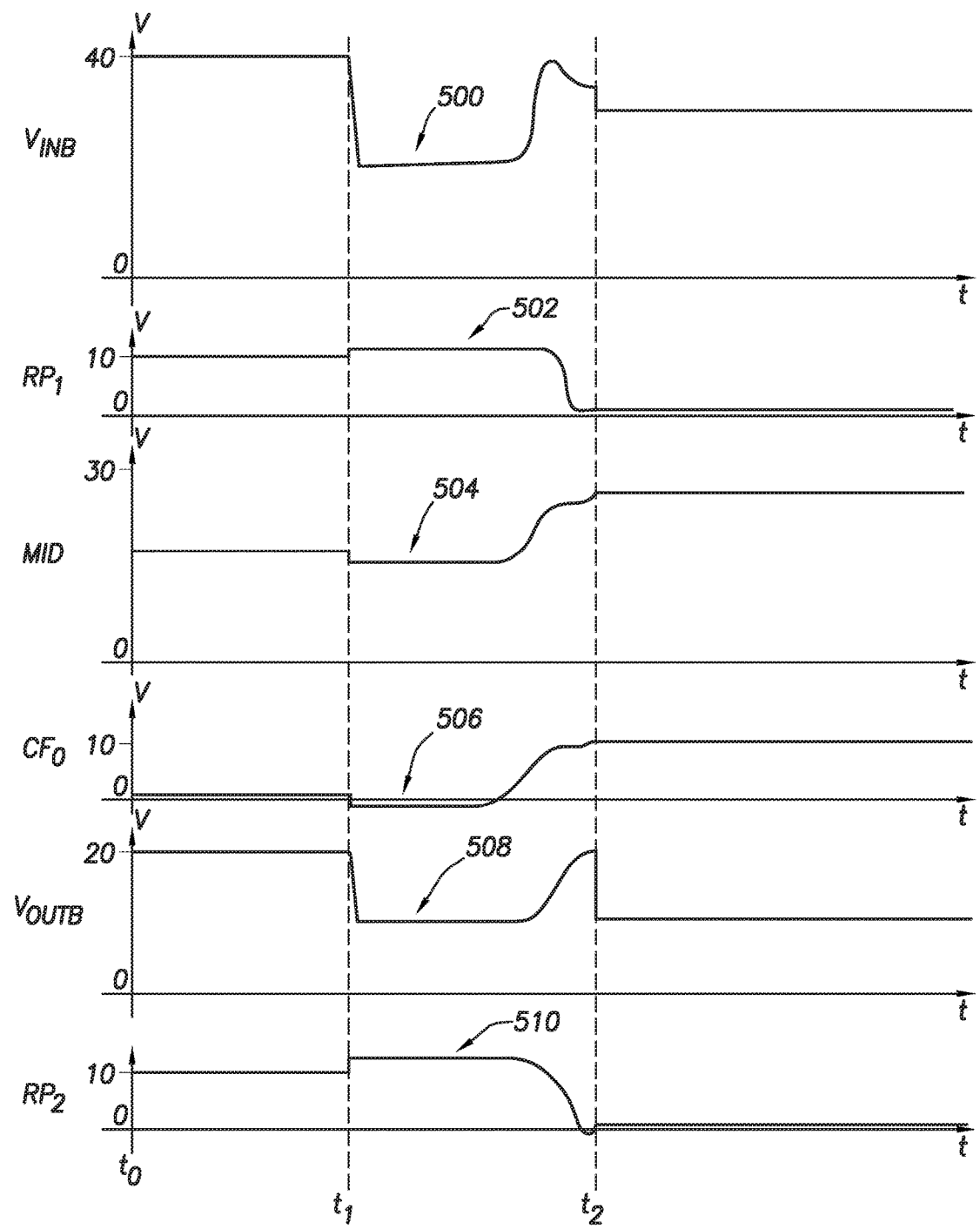
FIG. 5 shows a timing diagram of various voltages within a Dickson converter in accordance with at least some embodiments.

FIG. 5 shows a timing diagram of various voltages within a Dickson converter in accordance with at least some embodiments. In particular, FIG. 5 shows voltages at various branch nodes within the Dickson converter 100 (FIG. 2B) as function of corresponding time in the transition between the end of phase one (at time t2) and the beginning of phase two (again at time t2) assuming the various FETs are turned off after the ZCS point within each branch (i.e., the switching frequency is lower than the resonant frequency within each resonant branch). As before, so as not to unduly complicate the figure it is assumed that the various FETs that are conductive during phase one within each branch are turned off simultaneously, but as already discussed the FETs may be turned off at different times to accommodate the ZCS switching.

As can be seen in FIG. 5, the voltage at the branch node VINB 126 (FIG. 2B) during the active part of phase one equals the example input voltage VIN of 40 V. During the dead time between t1 and t2 (i.e., the FETs non-conductive) in this late switching case the voltage at the branch node VINB 126 drops to about 20V during zone 500, and then oscillates briefly around about 35V, and at the start of phase two at time t2 the voltage drops to about 30V. The voltage at the branch node RP1 134 (FIG. 2B) during the active part of phase one equals the example output voltage $V_{OUT}$ of 10V. During the dead time between t1 and t2 (i.e., the FETs non-conductive) in this late switching case the voltage at the branch node RP1 134 climbs slightly above 10V in zone 502, and then at the start of phase two at time t2 the voltage drops to zero. The voltage at the branch node MID 167 (FIG. 2B) during the active part of phase one equals the midpoint voltage in this example (i.e., 20V). During the dead time between t1 and t2 (i.e., the FETs non-conductive) in the late switching case the voltage at the branch node MID 167 remains largely unchanged during the early portion of the dead time (zone 504), and then settles out at about 30V. The voltage at the branch node CFO 170 (FIG. 2B) during the active part of phase is grounded through FET Q8 160. During the dead time between t1 and t2 (i.e., the FETs non-conductive) during the late switching case the voltage at the branch node CFO 170 is slightly negative in zone 506, and then rises to the output voltage $V_{OUT}$ at the beginning of the phase two at time t2. The voltage at the branch node VOUTB 191 (FIG. 2B) during the active part of phase one equals the midpoint voltage in this example (i.e., 20V). During the dead time between t1 and t2 (i.e., the FETs non-conductive) in this late switching case the voltage at the branch node VOUTB 191 initially drops to about 10V in zone 508, and then rises toward 20V, and at the start of phase two at time t2 the voltage drops to the output voltage $V_{OUT}$. Finally, the voltage at the branch node RP2 189 (FIG. 1) during the active part of phase one equals the example output voltage $V_{OUT}$ of 10V. During the dead time between t1 and t2 (i.e., the FETs non-conductive) in this late switching case the voltage at the branch node RP2 189 initially climbs slightly above 10V in zone 510, and then at the start of phase two at time t2 the voltage drops to zero.

In accordance with example embodiments, a driver IC (discussed more below) can determine whether the various branches were switched late by detecting voltages at the various branch nodes during the dead time. For example, comparing FIGS. 3 and 5, the driver IC can detect a late switching of the first branch 102 (FIG. 1) by the fact the voltage at the branch node VINB 126 (FIG. 2B) saturates low in the initial part of the dead time as in FIG. 5 zone 500, as opposed to oscillating in the early part of the dead time as in FIG. 3. As another example, the driver IC can detect a late switching in the first branch 102 by the fact the voltage at the branch node RP1 134 (FIG. 2B) remains high in the initial part of the dead time as in FIG. 5 zone 502, as opposed to dropping low as in FIG. 3. By sensing any of the various voltages noted, the driver IC may detect that the first on time of the first branch during phase one was different than the resonant half-period (e.g., longer than the resonant half-period), and adjust the first on time used in a subsequent first phase cycle.

As yet another example, the driver IC can detect late switching in the third branch 106 (FIG. 2B) by the fact that the voltage at the branch node VOUTB 191 (FIG. 2B) goes low during the initial part of the dead time as in FIG. 5 zone 508, as opposed to initially dropping below 20V in the early part of the dead time as in FIG. 3. As another example, the driver IC can detect a late switching in the third branch 106 by the fact the voltage at the branch node RP2 189 (FIG. 2B) remains high in the initial part of the dead time as in FIG. 5 zone 510, as opposed oscillating earlier in the dead time as in FIG. 3. By sensing any of the various voltages noted, the driver IC may detect that the second on time of the third branch during phase one was different than the resonant half-period (e.g., longer than the resonant half-period), and adjust the second on time used in a subsequent first phase cycle.

Figure 6:
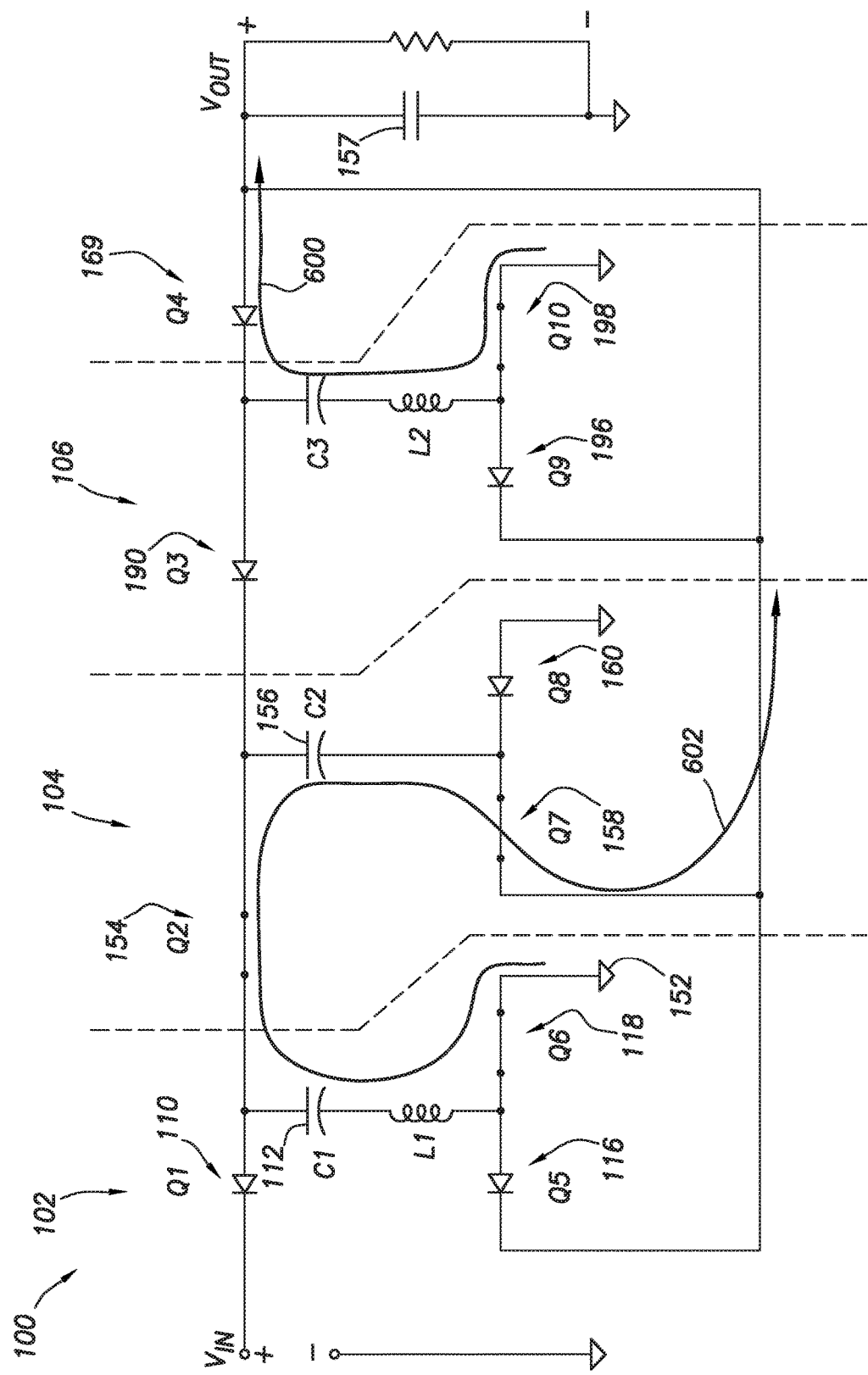
FIG. 6 shows a circuit diagram of the example Dickson converter during phase two in accordance with at least some embodiments.

FIG. 6 shows a circuit diagram of the example Dickson converter 100 during phase two in accordance with at least some embodiments. In particular, FIG. 6 shows a circuit diagram during the active portion of phase two when the FETs are conducting. As before, all the FETs that are conductive within the active portion of a phase of operation are made conductive simultaneously. Thus, for purposes of explanation phase two will be said to begin at the instant when all the FETs that are conductive during phase two are made conductive, and phase two is considered to finish at the end of a dead time after all the FETs that are conductive during phase two are made nonconductive. Thus, each phase also includes a dead time at the end of the phase (though the length of the dead time may be different for each branch), and the dead time will be considered to be part of the phase.

In FIG. 6 the FETs that are conductive during phase two are shown as short circuits, and the FETs that are not conductive during phase two are shown merely as their body diodes. During the example phase two, and for the first branch 102, FET Q6 118 is conductive, and FET Q1 110 and FET Q5 116 are nonconductive. During the example phase two, and for the second branch 104, FET Q2 154 and FET Q7 158 are conductive, and FET Q8 160 is nonconductive. And for the third branch 106, FET Q10 198 is conductive, and FET Q3 190 and FET Q9 196 are nonconductive. Also during the phase two FET Q4 169 is conductive.

In accordance with example embodiments then, during phase two a resonant current is driven through the third branch 106 to the output voltage $V_{OUT}$ as shown by arrow 600. Because of the LC circuit in the third branch, the third branch has a resonant frequency given by Equation (1) above. Initially when the FETs Q10 198 and Q4 169 are made conductive, current flows as shown by arrow 600. However, if the FETs remain conductive too long, because of the resonance the current will change direction, and thus draw current from the capacitor 157 of the output voltage $V_{OUT}$. Oppositely, if the FETs remain conductive too short a time (e.g., the current is still positive and non-zero, or outside a predetermined window of current around zero amps), current will still be flowing to the capacitor 157 when the FETs are made nonconductive.

In accordance with example embodiments, during phase two a driver IC controls the FET Q10 198 of the third branch 106 and FET Q4 169 such that the FETs are made nonconductive at the point when the current flow represented by arrow 600 reaches zero (i.e., the ZCS point). The point in time at which ZCS occurs is, as discussed with respect to phase one, the resonant half-period.

Still referring to FIG. 6, further during the example phase two, a resonant current is driven through the first branch 102 and to the output voltage $V_{OUT}$ as shown by arrow 602. In this case, the current may be considered to flow from the ground 152, through the LC circuit of the first branch 102, through capacitor 156, and then to the output voltage $V_{OUT}$. As before, arrow 602 implies a current direction flowing to the output voltage $V_{OUT}$. Because of the LC circuit in the first branch 102, the first branch has a resonant frequency during phase two. However, the presence of the capacitor 156 from the second branch 104 coupled the LC circuit of the first branch 102 changes slightly the resonant frequency from that given in Equation (1) above. In particular, if it is assumed again that the output capacitor is significantly larger than the capacitor C1 112, and if it is further assumed that the capacitance of capacitor C2 156 is much larger than capacitor C1 112 (e.g., C2=kC1), the resonant frequency of the first branch 102 during phase one is given by Equation (2) above. Initially when the FETs Q6 118, Q2 154, and Q7 158 are made conductive, current flows as shown by arrow 602. However, if the FETs remain conductive too long the current will change direction, and thus draw current from the capacitor 157 of the output voltage $V_{OUT}$. Oppositely, if the FETs remain conductive too short a time (e.g., the current is still positive and non-zero, or outside a predetermined window of current around zero amps), current will still be flowing when the FETs are made non-conductive.

In accordance with example embodiments, during phase two the driver IC (discussed more below) controls the FETs of the first branch 102 (and the second branch 104) such that the FETs are made nonconductive at the point when the current flow represented by arrow 602 reaches zero (i.e., the ZCS point), which occurs at the end of the resonant half-period. It is noted, however, that the resonant half-period for the third branch 106 during phase two is different than the resonant half-period of the first branch 102 during phase two. Thus, in accordance with example embodiments the driver IC separately controls the various FETs during phase two, turning off each set of FETs at the expiration of an on time (calculated in a previous phase two) expected to achieve ZCS.

Once the various FETs are made nonconductive (e.g., as shown in FIG. 2B), the driver IC (discussed more below) detects how closely switching occurred to the actual ZCS point within each branch during phase two, and adjusts desired on times for use in a subsequent phase two based on the detection. More precisely, the driver IC electrically isolates all the branches of the Dickson converter 100 by making all the FETs nonconductive, thus defining the dead time. The driver IC may detect that the third on time (associated with the first branch 102 during phase two) was different than the resonant half-period of the first branch 102 during phase two. When a difference is noted, the driver IC adjusts the third on time to be used in a subsequent cycle of phase two, and the adjustment makes the third on time more closely match the resonant half-period of the first branch 102 during phase two. Similarly, the driver IC detects that the fourth on time (associated with the third branch 106 during phase two) was different than the resonant half-period of the third branch 106 during phase two. When a difference is noted, the driver IC adjusts the fourth on time to be used in a subsequent cycle of phase two, and the adjustment makes the fourth on time more closely match the resonant half-period of the third branch 106 during phase two.

The transition between phase one and phase two, and detecting whether the on times during phase one match or are different than their respective resonant half-periods, was discussed in detail with respect to FIGS. 3-5. It turns out that detecting whether the on times during phase two match or are different than their respective resonant half-periods is related in concept to the phase one case. That is, when the on times match the respective half-periods (i.e., ZCS), the various voltages at the various branch nodes have certain characteristics. When the switching is performed early, the voltage characteristics have certain features that indicate early switching took place. When the switching is performed late, the voltage characteristics have certain features that indicate late switching took place. One of ordinary skill in the art, with the benefit of this disclosure, could now determine the early or late switching voltage characteristics, and thus could design a power converter and related driver IC to operate in the phase two to phase one transition. Thus, so as not to unduly lengthen this specification, timing diagrams for the dead time associated with the end of phase two are not presented. The specification now turns to a power converter, including a Dickson converter and a driver IC, in accordance with at least some embodiments.

Figure 7:
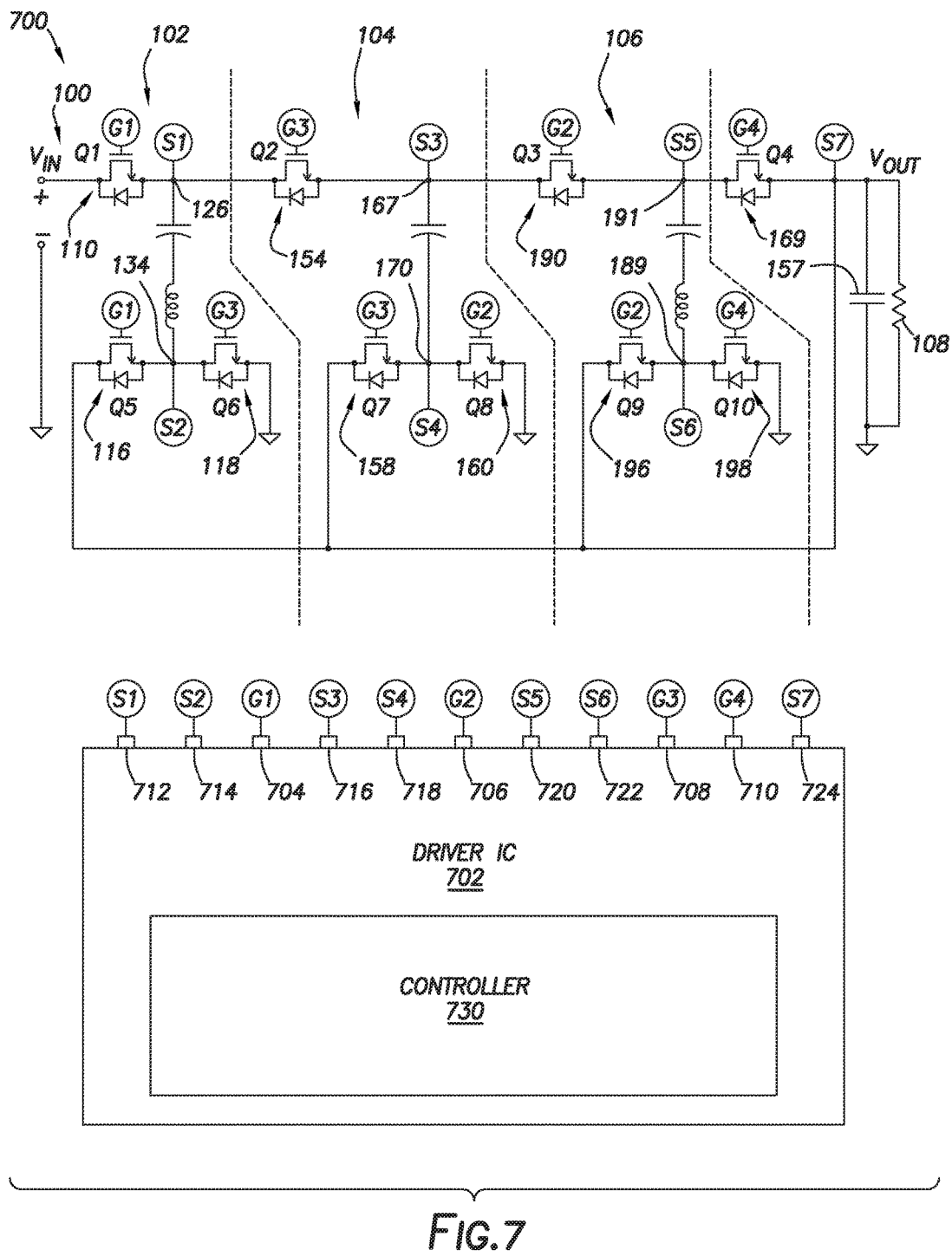
FIG. 7 shows a power converter in accordance with at least some embodiments.

FIG. 7 shows a power converter in accordance with at least some embodiments. In particular, FIG. 7 shows an example power converter 700 including a Dickson converter 100 coupled to driver IC 702. As before, the Dickson converter 100 comprises the first branch 102, second branch 104, and third branch 106. The Dickson converter 100 is the same or similar to FIG. 1, and thus the description will not be repeated again here.

The power converter 700 further comprises the driver IC 702 coupled to the Dickson converter 100. The example driver IC 702 defines a plurality of terminals that couple to the Dickson converter. In the example case of a Dickson converter 100 with three branches, the driver IC 702 defines four terminals that couple to various gates of various FETs of the Dickson converter 100. In particular, the example driver IC 702 defines a group one terminal 704, a group two terminal 706, a group three terminal 708, and a group four terminal 710. The example group one terminal 704 couples to the gates of FETs Q1 110 and Q5 116 (as shown by the bubble "G1" in the figure). The example group two terminal 706 couples to the gates of FETs Q8 160, Q3 190, and Q9 196 (as shown by the bubble "G2" in the figure). The example group three terminal 708 couples to the gates of FETs Q6 118, Q2 154, and Q7 158 (as shown by the bubble "G3" in the figure). The example group four terminal 710 couples to the gate of FETs Q4 169 and Q10 198 (as shown by the bubble "G4" in the figure).

During the first phase, the driver IC 702 is designed and constructed to separately control an asserted time of the group one terminal 704 from an asserted time of the group two terminal 706, while holding the group three terminal 708 and group four terminal 710 de-asserted. Similarly, during the second phase, the driver IC 702 is designed and constructed to separately control an asserted time of the group three terminal 708 from an asserted time of the group four terminal 710, while holding the group one terminal 704 and group two terminal 706 de-asserted.

The example driver IC 702 further comprises a plurality of sense terminals. In particular, the example driver IC 702 comprises a VINB sense terminal 712, a RP1 sense terminal 714, a MID sense terminal 716, a CFO sense terminal 718, a VOUTB sense terminal 720, a RP2 sense terminal 722, and an output voltage sense terminal 724. The VINB sense terminal 712 couples to the branch node 126 (as shown by the bubble "S1"). The RP1 sense terminal 714 couples to the branch node 134 (as shown by the bubble "S2"). The MID sense terminal 716 couples to the branch node 167 (as shown by the bubble "S3"). The CFO sense terminal 718 couples to the branch node 170 (as shown by the bubble "S4"). The VOUTB sense terminal 720 couples to the branch node 191 (as shown by the bubble "S5"). The RP2 sense terminal 722 couples to the branch node 189 (as shown by the bubble "S6"). And the output voltage sense terminal 724 couples to the output voltage $V_{OUT}$ (as shown by the bubble "S7"). It is noted that not all driver ICs 702 will have all the noted sense terminals. For example, some driver ICs 702 may use only the RP1 sense terminal 714 and the RP2 sense terminal 722 to perform a task of determining whether an on time of branch matched the resonant half-period of that branch during that phase.

The example driver IC 702 of FIG. 7 may thus make conductive and nonconductive various FETs to implement the various phases (by way of the group terminals), and may detect that the on times were different than the resonant half-periods (by way of the sense terminals). For example, during the first phase or phase one, the example driver IC 702 may be configured to drive a resonant current of the first branch 102 to the output voltage $V_{OUT}$ for a first on time by assertion of the group one terminal 704. After assertion of the group one terminal 704, the driver IC 702 may electrically isolate the first branch for a first dead time by de-assertion of the group one terminal 704 and group three terminal 708. During the dead time thereby created, the driver IC 702 may detect (e.g., by way of the RP1 sense terminal 714) that the first on time was different than a resonant half-period of the resonant current of the first branch during the first phase. The driver IC 702 may further adjust the first on time used in a subsequent cycle of driving the resonant currents, the adjustment makes the first on time more closely match the resonant half-period of the first branch during the subsequent first phase.

Further during the example first phase, the driver IC 702 of FIG. 7 may drive a resonant current of the third branch to the output voltage for a second on time by assertion of the group two terminal 706. The example driver IC 702 may then electrically isolate the third branch 106 by de-assertion of the group two terminal 706 and the group four terminal 710. Thereafter, the driver IC 702 may detect (e.g., by way of the RP2 sense terminal 722), during a second dead time, that the second on time was different than a resonant half-period of the resonant current of the third branch 106 during the first phase. The driver IC 702 may further adjust the second on time used in a subsequent cycle of driving the resonant currents, the adjustment makes the second on time more closely match the resonant half-period of the third branch during the first phase.

During an example phase two, the driver IC 702 of FIG. 7 may drive a resonant current of the first branch 102 to the voltage output through the second branch 104 for a third on time by assertion of the group three terminal 708. Thereafter, the driver IC 702 may electrically isolate the first branch 102 for a third dead time by de-assertion of the group one terminal 704 and group three terminal 708. The driver IC 702 may detect (e.g., by way of the RP1 sense terminal 714), during the third dead time, that the third on time was different than a resonant half-period of the first branch 102 during the second phase. The driver IC 702 may further adjust the third on time used in a subsequent cycle of driving the resonant currents, the adjustment makes the third on time more closely match the resonant half-period of the first branch 102 during the second phase.

Further during an example phase two, the driver IC 702 of FIG. 7 may drive a resonant current of the third branch 106 to the output voltage for a fourth on time by assertion of the group four terminal 710. Thereafter, the driver IC 702 may electrically isolate the third branch 106 for a fourth dead time by de-assertion of the group two terminal and the group four terminal. The driver IC 702 may detect (e.g., by way of the RP2 sense terminal 722), during the fourth dead time, that the fourth on time was different than a resonant half-period of the resonant current of the third branch 106 during the second phase. The driver IC 702 may further adjust the fourth on time used in a subsequent cycle of driving the resonant currents, the adjustment makes the fourth on time more closely match the resonant halt-period of the third branch 106 during the second phase.

All the example functions of the driver IC 702 may be implemented by way of a controller 730 within the driver IC 702. The controller 730 may take any suitable form, such as an application specific integrated circuit (ASIC), a microcontroller (with controlling software), a field programmable gate array (FPGA), or combinations thereof. In some cases the controller 730 may be a single monolithic integrated circuit packaged (e.g., encapsulated) to be the driver IC 702. In other cases, the controller 730 may be multiple semiconductor dies co-packaged (e.g., a multichip module (MCM)) to be the driver IC 702. The specification now turns to an example implementation of controller 730.

Figure 8:
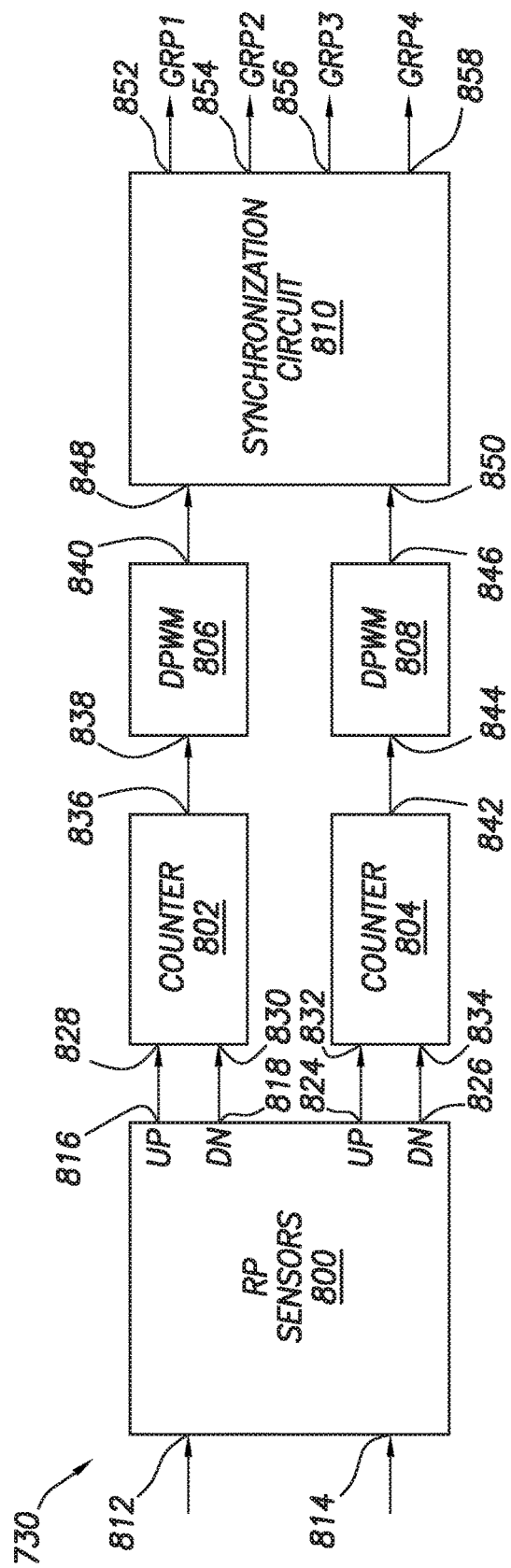
FIG. 8 shows a functional block diagram of a controller in accordance with at least some embodiments.

FIG. 8 shows a functional block diagram of a portion of a controller 730 in accordance with at least some embodiments. In particular, FIG. 8 shows a set of functional blocks to describe one example implementation of a controller 730 for a particular phase (e.g., phase one). The example controller 730 comprises a set of RP sensors 800, two counters 802 and 804, two digital pulse-width modulators (DPWM) 806 and 808, and a synchronization circuit 810. Each will be discussed in turn.

The example RP sensor 800 has two sense inputs 812 and 814. In the example case of sensing voltages on the branch nodes RP1 and RP2 as indicative of whether the on-times match the respective resonant half-periods during a phase, the sense inputs 812 and 814 are coupled to the RP1 sense terminal 714 (FIG. 7) and RP2 sense terminal 722 (FIG. 7), respectively. However, sensing whether the on-times match the respective resonant half-periods during a phase may involve sensing different and/or additional voltages (e.g., the voltages on the VINB sense terminal 712 (FIG. 7) or the VOUTB sense terminal 720). The example RP sensor 800 may thus detect the voltages at its inputs 812 and 814 and produce a set of digital outputs. An example benefit to choosing the RP branch nodes is that the voltage on these branch nodes swings between ground and 0.25 times $V_{IN}$, so a relatively lower voltage range. Furthermore the RP branch node voltages are directly referred to ground, so even the inputs of the comparators used as sensors will have voltages or thresholds referred to ground. The example RP sensor 800 may produce a count up output 816 and a count down output 818 associated with the first branch 102 (FIG. 1) during phase one. When the first on time does not match the resonant half-period, the RP sensor 800 temporarily asserts either the count up output 816 or the count down output 818. Likewise, if the first on time matched the resonant half-period for the first branch 102 during phase one, then neither count output 816 nor 818 are asserted. Further, the example RP sensor 800 may produce a count up output 824 and a count down output 826 associated with the third branch 106 (FIG. 1) during phase one. When the second on time does not match the resonant half-period of the third branch 106, the RP sensor 800 temporarily asserts either the count up output 824 or the count down output 826. Likewise, if the second on time matched the resonant half-period for the third branch 106 during phase one, then neither count output 824 nor 826 are asserted.

The counters 802 and 804 are coupled to the count outputs of the RP sensor 800. In particular, consider that counter 802 is associated with the first branch 102 during phase one, and thus the counter 802 has a count up input 828 (coupled to the count up output 816) and a count down input 830 (coupled to the count down output 818). The example counter 802 may initiate to a non-zero count value (e.g., in the middle of the count range for the counter 802). When the count up input 828 is asserted, the count value held by the counter 802 may increase by an incremental amount. Likewise, when the count down input 830 is asserted, the count value held by the counter 802 may decrease by an incremental amount (e.g., 10 nanoseconds, which may be the same incremental amount as the count up increase). The value held by the counter 802 thus represents a first on time for the first branch 102 to be used in a subsequent phase one.

Further consider that counter 804 is associated with the third branch 106 during phase one, and thus the counter 804 has a count up input 832 (coupled to the count up output 824) and a count down input 834 (coupled to the count down output 826). The example counter 804 may initiate to a non-zero count value (e.g., in the middle of the count range for the counter 804). When the count up input 832 is asserted, the count value held by the counter 804 may increase by an incremental amount. Likewise, when the count down input 834 is asserted, the count value held by the counter 804 may decrease by an incremental amount (e.g., 10 nanoseconds, which may be the same incremental amount as the count up increase). The value held by the counter 804 thus represents a second on time for the third branch 106 to be used in a subsequent phase one.

The example counters 802 and 804 each couple to respective DPWMs 806 and 808. In particular, the counter 802 defines a count output 836 on which the counter 802 drives a value (e.g., a digital value) representing a first on time for the first branch 102 to be used in the next phase one cycle. The DPWM 806 defines a count input 838 and a pulse output 840. The DPWM 806 may create a pulse on the pulse output 840 having a duration controlled by the value received on the count input 838, and the duration being the first on time for the next phase one. Counter 804 defines a count output 842 on which the counter 804 drives a value (e.g., a digital value) representing a second on time to be used in the next phase one cycle. The DPWM 810 defines a count input 844 and a pulse output 846. The DPWM 808 may create an analog pulse on the pulse output 846 having a duration controlled by the value received on the count input 844, and the duration being the second on time for the third branch 106 for the next phase one.

The synchronization circuit 810 defines a pulse input 848 and pulse input 850. Moreover, the example synchronization circuit 810 defines four outputs: group one output 852; group two output 854; group three output 856; and group four output 858. The example synchronization circuit 810 may assert and de-assert the group outputs based on the pulse signals received on the pulse inputs 848 and 850. For example, during phase one the synchronization circuit 810 may assert the group one output 852 for an amount of time controlled by the asserted time of the pulse input 848, and further during phase one the synchronization circuit 810 may assert the group three output 856 for an amount of time controlled by the asserted time of the pulse input 850. In some cases the synchronization circuit 810 receives the pulse times on the pulse inputs 848 and 850 (e.g., during dead times at the end of phase one), and stores the pulse times until the next phase one begins. In other cases, the synchronization circuit 810 may trigger the DPWMs 806 and 808 to provide the digital pulses during the next phase one, and pass those digital pulses through to their respective group outputs. The example synchronization circuit 810 aligns the beginning of assertion of group one output 852 and the group three output 856 during phase one, but as previously mentioned the on-time for the group one output 852 may be different than the on-time for the group three output 856. Even if with different on-times, the synchronization circuit 810 thus adapts the dead times to have phase one end simultaneously (and phase two can begin (e.g., time t2 of FIG. 3)). The example synchronization circuit 810 also aligns the beginning of assertion of group two output 854 and the group four output 858 during phase two, but again as previously mentioned the on-time for the group two output 854 may be different than the on-time for the group four output 858. Even if with different on-times in phase two, the synchronization circuit 810 thus adapts the dead times to have phase two end simultaneously (and phase one can begin).

The example controller 730 of FIG. 8 focuses on phase one, thus having RP sensors 800, counters 802 and 804, and DPWMs 806 and 808 to correct and track phase one on times (e.g., the first and second on times). Now understanding the example circuit for use with phase one, one of ordinary skill, with the benefit of this disclosure, will understand that an additional set of RP sensors will be used to determine how closely the on times for phase two matches the respective resonant half-periods of phase two. An additional set of counters will be used to track on times for phase two (e.g., the third and fourth on times). And an additional set of DPWMs may be used to create digital pulses from the count values of those additional counters. So as not to unduly lengthen the specification, those additional RP sensors, counters, and DPWMs are not shown.

Figure 9:
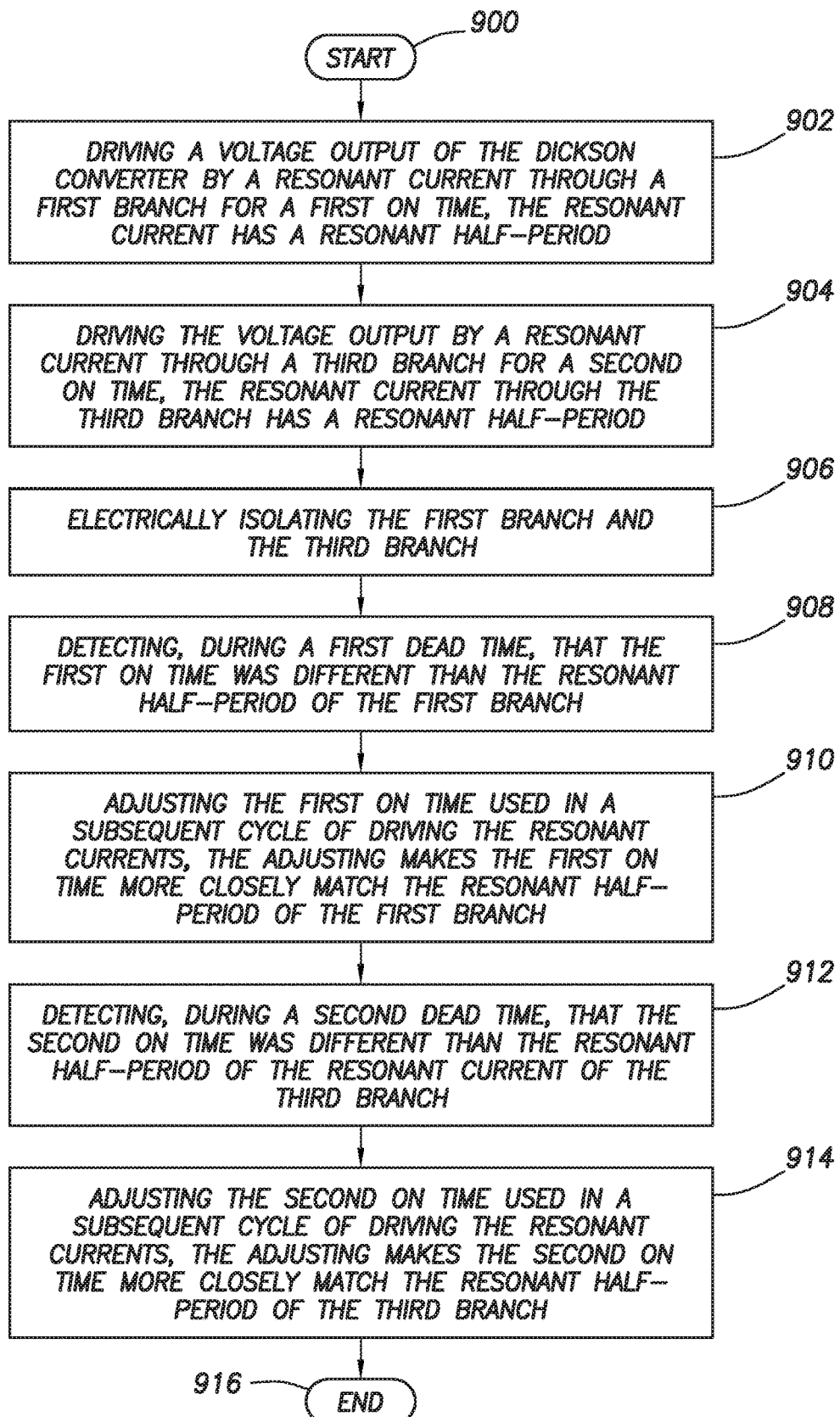
FIG. 9 shows a method in accordance with at least some embodiments.

FIG. 9 shows a method in accordance with at least some embodiments. In particular, the method starts (block 900) and comprises: driving a voltage output of the Dickson converter by a resonant current through a first branch for a first on time, the resonant current has a resonant half-period (block 902); driving the voltage output by a resonant current through a third branch for a second on time, the resonant current through the third branch has a resonant half-period (block 904); electrically isolating the first branch and the third branch (block 906); detecting, during a first dead time, that the first on time was different than the resonant half-period of the first branch (block 908); adjusting the first on time used in a subsequent cycle of driving the resonant currents, the adjusting makes the first on time more closely match the resonant half-period of the first branch (block 910); detecting, during a second dead time, that the second on time was different than the resonant half-period of the resonant current of the third branch (block 912); and adjusting the second on time used in a subsequent cycle of driving the resonant currents, the adjusting makes the second on time more closely match the resonant half-period of the third branch (block 914). Thereafter the method ends (block 916).

Many of the electrical connections in the drawings are shown as direct couplings having no intervening devices, but not expressly stated as such in the description above. Nevertheless, this paragraph shall serve as antecedent basis in the claims for referencing any electrical connection as "directly coupled" for electrical connections shown in the drawing with no intervening device(s).

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A method of operating a Dickson converter, comprising:
   driving a voltage output of the Dickson converter by a resonant current through a first branch for a first on time, the resonant current has a resonant half-period;
   driving the voltage output by a resonant current through a third branch for a second on time, the resonant current through the third branch has a resonant half-period; and then
   electrically isolating the first branch and the third branch;
   detecting, during a first dead time, that the first on time was different than the resonant half-period of the first branch;
   adjusting the first on time used in a subsequent cycle of driving the resonant currents;
   detecting, during a second dead time, that the second on time was different than the resonant half-period of the resonant current of the third branch; and adjusting the second on time used in a subsequent cycle of driving the resonant currents.

2. The method of claim 1 wherein detecting that the first on time was different further comprises detecting a first value indicative of current flow through the first branch during the first dead time.

3. The method of claim 2 wherein adjusting further comprises shortening the first on time if the first value indicative of current flow indicates the resonant current through the first branch changed polarity before expiration of the first on time.

4. The method of claim 2 wherein adjusting further comprises lengthening the first on time if the first value indicative of current flow indicates the resonant current through the first branch had a first polarity and was outside a predetermined window of current around zero amps before expiration of the first on time.

5. The method of claim 2 wherein detecting the first value indicative of current flow through the first branch further comprises detecting a voltage on a lead of an inductor of the first branch.

6. The method of claim 2 wherein detecting the first value indicative of current flow through the first branch further comprises detecting a voltage on a lead of a capacitor of the first branch.

7. The method of claim 1 further comprising, after expiration of the first and second dead time:
  driving the voltage output through a second branch by the resonant current of the first branch for a third on time;
  driving current to a downstream component by the resonant current of the third branch for a fourth on time; and then
  electrically isolating the first branch, the second branch, and the third branch;
  detecting, during a third dead time, that the third on time was different than the resonant half-period of the first branch;
  adjusting the third on time used in a subsequent cycle of driving the resonant currents, the adjusting makes the third on time more closely match the resonant half-period of the first branch;
  detecting, during a fourth dead time, that the fourth on time was different than the resonant half-period of the third branch; and
  adjusting the fourth on time used in a subsequent cycle of driving the resonant currents, the adjusting makes the fourth on time more closely match the resonant half-period of the third branch.

8. The method of claim 7 wherein detecting that the third on time was different further comprises detecting a second value indicative of current flow through the first branch during the third dead time.

9. The method of claim 7 wherein the driving current to the downstream component further comprises at least one selected from a group comprising: driving to the voltage output; and driving to a downstream branch of the Dickson converter between the third branch and the voltage output.

10. A power converter comprising:
  a Dickson converter comprising:
    a first branch comprising:
      a first field effect transistor (FET) defining a gate, a source, and a drain, the drain coupled to an input voltage of the Dickson converter;
      a first capacitor coupled in series with a first inductor;
      a second FET defining a gate, a source, and a drain, the drain of the second FET coupled to a voltage output of the Dickson converter, and the source coupled to the first inductor; and
      a third FET defining a gate, a source, and a drain, the drain of the third FET coupled to the source of the second FET, and the source of the third FET coupled to a ground;
    a second branch comprising:
      a fourth FET defining a gate, a source, and a drain, the drain of the fourth FET coupled to the source of the first FET;
      a second capacitor defining a first lead and a second lead, the first lead coupled to the source of the fourth FET;
      a fifth FET defining a gate, a source, and a drain, the drain of the fifth FET coupled to the voltage output, and the source of the fifth FET coupled to the second lead of the second capacitor; and
      a sixth FET defining a gate, a source, and a drain, the drain of the sixth FET coupled to the source of the fifth FET, and the source of the sixth FET coupled to the ground;
    a third branch comprising:
      a seventh FET defining a gate, a source, and a drain, the drain of the seventh FET coupled to the source of the fourth FET;
      a third capacitor coupled in series with a second inductor;
      an eighth FET defining a gate, a source, and a drain, the drain of the eighth FET coupled to the voltage output, and the source of the eighth FET coupled to the second inductor; and
      a ninth FET defining a gate, a source, and a drain, the drain of the ninth FET coupled to the source of the eight FET, and the source of the ninth FET coupled to the ground;
    a tenth FET coupled to the source of the seventh FET;
  a driver integrated circuit (IC) comprising:
    a group one terminal coupled to the gates of the first and second FETs;
    a group two terminal coupled to the gates of the sixth, seventh, and eighth FETs;
    a group three terminal coupled to the gates of the third, fourth, and fifth FETs;
    a group four terminal coupled to the gates of the ninth and tenth FETs;
    the driver IC is configured to, during a first phase, separately control an asserted time of the group one terminal from an asserted time of the group two terminal, while holding the group three terminal and group four terminal de-asserted.

11. The power converter of claim 10 wherein the driver IC further comprises:
  a first sense terminal coupled to a node between the second and third FETs; and
  the driver IC is configured to, during the first phase:
    drive a resonant current of the first branch to the voltage output for a first on time by assertion of the group one terminal; and then
    electrically isolate the first branch for a first dead time by de-assertion of the group one terminal and group three terminal;
    detect, by way of the first sense terminal and during the first dead time, that the first on time was different than a resonant half-period of the resonant current of the first branch during the first phase; and
    adjust the first on time used in a subsequent cycle of driving the resonant currents, the adjustment makes the first on time more closely match the resonant half-period of the first branch during the first phase.

12. The power converter of claim 11 wherein the driver IC further comprises:
a second sense terminal coupled to a node between the eighth and ninth FETs; and
the driver IC is configured to, during the first phase:
drive a resonant current of the third branch to the voltage output for a second on time by assertion of the group two terminal; and
electrically isolate the third branch by de-assertion of the group two terminal and the group four terminal;
detect, by way of the second sense terminal and during a second dead time, that the second on time was different than a resonant half-period of the resonant current of the third branch during the first phase; and
adjust the second on time used in a subsequent cycle of driving the resonant currents, the adjustment makes the second on time more closely match the resonant half-period of the third branch during the first phase.

13. The power converter of claim 10 wherein the driver IC is further configured to, during a second phase, separately control an asserted time of the group three terminal from an asserted time of the group four terminal, while holding the group one terminal and group two terminal de-asserted.

14. The power converter of claim 13 wherein the driver IC further comprises:
a first sense terminal coupled to a node between the second and third FETs; and
the driver IC is configured to, during the second phase:
drive a resonant current of the first branch to the voltage output through the second branch for a third on time by assertion of the group three terminal; and then
electrically isolate the first branch for a third dead time by de-assertion of the group one terminal and group three terminal;
detect, by way of the first sense terminal and during the third dead time, that the third on time was different than a resonant half-period of the first branch during the second phase; and
adjust the third on time used in a subsequent cycle of driving the resonant currents, the adjustment makes the third on time more closely match the resonant half-period of the first branch during the second phase.

15. The power converter of claim 14 wherein the driver IC further comprises:
a second sense terminal coupled to a node between the eighth and ninth FETs; and
the driver IC is configured to, during the second phase:
drive a resonant current of the third branch to the voltage output for a fourth on time by assertion of the group four terminal; and then
electrically isolate the third branch for a fourth dead time by de-assertion of the group two terminal and the group four terminal;
detect, by way of the second sense terminal and during the fourth dead time, that the fourth on time was different than a resonant half-period of the resonant current of the third branch during the second phase; and
adjust the fourth on time used in a subsequent cycle of driving the resonant currents, the adjustment makes the fourth on time more closely match the resonant half-period of the third branch during the second phase.

16. A driver integrated circuit (IC) for driving a Dickson converter in a first phase and a subsequent second phase, comprising:
a group one terminal, the group one terminal asserted during a first on time;
a group two terminal, the group two terminal asserted during a second on time;
a group three terminal, the group three terminal asserted during a third on time;
a group four terminal, the group four terminal asserted during a fourth on time;
a first sense terminal configured to couple to a node of a first branch of the Dickson Converter; and
the controller configured to, during the first phase:
assert the group one terminal for the first on time; and then
de-assert the group one terminal and group three terminal for a first dead time;
detect, by way of the first sense terminal and during the first dead time, that the first on time was different than a resonant half-period of a resonant current of the first branch during the first phase; and
adjust the first on time used in a subsequent first phase cycle.

17. The driver IC of claim 16 further comprising:
a second sense terminal configured to couple to a node of a third branch of the Dickson Converter; and
the controller configured to, during the first phase:
assert the group two terminal for the second on time; and then
de-assert the group two terminal and the group four terminal for a second dead time;
detect, by way of the second sense terminal and during the second dead time, that the second on time was different than a resonant half-period of a resonant current of the third branch during the first phase; and
adjust the second on time used in a subsequent first phase cycle.

18. A driver integrated circuit (IC) for driving a Dickson converter in a first phase and a subsequent second phase, comprising:
a group one terminal, the group one terminal asserted during a first on time;
a group two terminal, the group two terminal asserted during a second on time;
a group three terminal, the group three terminal asserted during a third on time;
a group four terminal, the group four terminal asserted during a fourth on time;
a first sense terminal coupled to a node of a first branch of the Dickson converter; and
the controller is configured to, during the second phase:
assert the group three terminal for the third on time; and then
de-assert the group one terminal and group three terminal for a third dead time;
detect, by way of the first sense terminal and during the third dead time, that the third on time was different than a resonant half-period of the first branch during the second phase; and
adjust the third on time used in a subsequent second phase cycle.

19. The driver IC of claim 18 further comprising:
a second sense terminal coupled to a third branch of the Dickson converter; and
the controller is configured to, during the second phase:

assert the group four terminal for the fourth on time; and then de-assert the group two terminal and the group four terminal for a fourth dead time;

detect, by way of the second sense terminal and during the fourth dead time, that the fourth on time was different than a resonant half-period of the third branch during the second phase; and adjust the fourth on time used in a subsequent second phase cycle.

20. A driver integrated circuit (IC) for driving a Dickson converter in a first phase and a subsequent second phase, comprising:

a group one terminal, the group one terminal asserted during a first on time;

a group two terminal, the group two terminal asserted during a second on time;

a group three terminal, the group three terminal asserted during a third on time;

a group four terminal, the group four terminal asserted during a fourth on time;

first sense terminal configured to couple to a node of a first branch of the Dickson Converter;

a second sense terminal configured to couple to a node of a third branch of the Dickson Converter;

the controller comprising:

a sense circuit defining a first sense input, a first sense output, and a second sense output, the first sense input coupled to the first sense terminal;

a first up/down counter defining a count input and a count output, the count input coupled to the first sense output, and the first up/down counter configured to increment up or down responsive to a count signal on the count input;

a first pulse width modulation (PWM) circuit defining an on-time input and pulse output, the on-time input coupled to the count output of the first up/down counter;

a second up/down counter defining a count input and a count output, the count input of the second up/down counter coupled to the second sense output, and the second up/down counter configured to increment up or down responsive to a count signal on the count input of the second up/down counter;

a second PWM circuit defining an on-time input and pulse output, the on-time input of the second PWM circuit coupled to the count output of the second up/down counter; and the sense circuit configured to adjust the first on time by changing a count value driven to the on-time input of the first PWM circuit, and the sense circuit configured to adjust the second on time by changing a count value driven to the on-time input of the second PWM circuit.

* * * * *